(12) United States Patent
Tanno

(10) Patent No.: US 6,890,678 B2
(45) Date of Patent: May 10, 2005

(54) SEPARATOR FOR FUEL CELL

(75) Inventor: Fumio Tanno, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 10/447,157

(22) Filed: May 29, 2003

(65) Prior Publication Data
US 2003/0235750 A1 Dec. 25, 2003

(30) Foreign Application Priority Data
Jun. 24, 2002 (JP) ........................................ 2002-182745

(51) Int. Cl.$^7$ .............................. H01M 8/02; H01M 1/24
(52) U.S. Cl. .............................. 429/34; 429/35; 429/38; 252/511
(58) Field of Search ................................ 429/30, 34–36, 429/38–39, 41, 253, 129; 252/511; 29/623.1

(56) References Cited

U.S. PATENT DOCUMENTS 6,242,124 B1 * 6/2001 Saito et al. .................... 429/38
6,660,420 B1 * 12/2003 Yoshida et al. ............... 429/34
2003/0180597 A1 * 9/2003 Sakamoto et al. ............ 429/34

* cited by examiner

*Primary Examiner*—Frankie L. Stinson
*Assistant Examiner*—Monique Wills
(74) *Attorney, Agent, or Firm*—Kubovcik & Kubovcik

(57) ABSTRACT

A separator for fuel cell, obtained by molding a resin composition comprising 100 parts by weight of a graphite, 15 to 30 parts by weight of a bisphenol A type epoxy resin, 2 to 4 parts by weight of a phenolic resin, and 1 to 10 parts by weight of a polycarbodiimide resin, which, unlike the prior art, is superior in moldability, electrical conductivity and mechanical strength and causes no cracking during molding even when made in a small thickness.

4 Claims, No Drawings

SEPARATOR FOR FUEL CELL

BACKGROUND OF THE INVENTION

1. Field of the Invention

The present invention relates to a separator for fuel cell which is superior in moldability, electrical conductivity and mechanical strength and which causes no cracking during molding even when made in a small thickness.

2. Description of the Prior Art

As separators for fuel cell, there have been known, for example, (1) a fuel cell separator obtained by subjecting a thermosetting resin to molding, firing and machining; (2) a fuel cell separator obtained by subjecting a dense carbon impregnated with a thermosetting resin, to machining; (3) a fuel cell separator obtained by subjecting a carbon fiber nonwoven impregnated with a conductive coating, to press lamination; (4) a fuel cell separator obtained by kneading a carbon powder and a phenolic resin and molding the kneaded product by hot pressing; and (5) a fuel cell separator obtained by compounding a carbon powder, a phenolic resin and a carbon fiber and subjecting the resulting compound to compression molding.

However, in the fuel cell separator (1) obtained by subjecting a thermosetting resin to molding, firing and machining and the fuel cell separator (2) obtained by subjecting a dense carbon impregnated with a thermosetting resin, to machining, there has been a problem of higher cost incurred by machining and, when the separator is made in a small thickness so as to meet a recent requirement, there has also been a problem of cracking tendency during machining or cell assembling.

In the fuel cell separator (3) obtained by subjecting a carbon fiber nonwoven impregnated with a conductive coating, to press lamination, there has been a problem that the nonwoven hinders formation of surface grooves which are indispensable for fuel cell separators. In the fuel cell separator (4) obtained by kneading a carbon powder and a phenolic resin and molding the kneaded product by hot pressing, there have been problems that moldability and mechanical strength decrease when the ratio of conductive filler is increased in order to increase electrical conductivity and, when the ratio of binder resin is increased in order to increase moldability and mechanical strength, electrical conductivity decreases.

In the fuel cell separator (5) obtained by compounding a carbon powder, a phenolic resin and a carbon fiber and subjecting the resulting compound to compression molding, there is an advantage that a very high strength and a very high elastic modulus can be obtained, but there has been a problem that this high elastic modulus invites somewhat easy cracking when the fuel cell separator is made in a small thickness.

SUMMARY OF THE INVENTION

The object of the present invention is to solve the above-mentioned problems of the prior art and provide a separator for fuel cell which is superior in moldability, electrical conductivity and mechanical strength and which causes no cracking during molding even when made in a small thickness.

The present invention lies in a separator for fuel cell, obtained by molding a resin composition comprising 100 parts by weight of a graphite, 15 to 30 parts by weight of a bisphenol A type epoxy resin, 2 to 4 parts by weight of a phenolic resin, and 1 to 10 parts by weight of a polycarbodiimide resin.

DETAILED DESCRIPTION OF THE INVENTION

The present invention is described in detail below.

The fuel cell separator of the present invention is obtained by molding a resin composition comprising a graphite, a bisphenol A type epoxy resin, a phenolic resin and a polycarbodiimide resin in given proportions. The graphite is preferably an artificial graphite (a massive graphite) obtained by subjecting a massive coke to high-degree graphitization. This artificial graphite made of a massive coke is hardly orientated during molding of fuel cell separator and accordingly has a high strength; therefore, the fuel cell separator of the present invention obtained by molding a resin composition comprising such an artificial graphite is superior in mechanical strength and, moreover, has a good electrical conductivity in the thickness direction and is small in fluctuation of resistance.

Further, the graphite used in the present invention is preferred to be powdery so that this component and other components can be mixed uniformly to give a uniform resin composition. The powdery graphite has an average particle diameter of preferably 10 to 200 $\mu$m, particularly preferably 30 to 100 $\mu$m. When the average particle diameter of the powdery graphite is less than 10 $\mu$m, the resin component is adsorbed by the graphite in a larger amount, resulting in a reduction in fluidity of resin composition. When the average particle diameter of the powdery graphite is more than 200 $\mu$m, the space between graphite particles is large, which may result in a reduction in mechanical strength of resin composition.

The bisphenol A type epoxy resin used in the present invention has an epoxy equivalent of preferably 500 to 4,000, particularly preferably 800 to 1,500. In the present fuel cell separator wherein a phenolic resin and a polycarbodiimide resin are allowed to function as a curing agent for the epoxy resin, when there is used an epoxy resin having an epoxy equivalent of less than 500, the resulting fuel cell separator becomes hard and fragile. When there is used an epoxy resin having an epoxy equivalent of more than 4,000, the amount of the epoxy group in each epoxy resin molecule (the epoxy group is a site with which the polycarbodiimide resin reacts) is small relative to the whole resin composition; as a result, no sufficient improvement is obtained in glass transition temperature and hot mechanical strength, which may result in inferior heat resistance or no resemblance between normal temperature mechanical strength and hot mechanical strength.

The bisphenol A type epoxy resin used in the present invention is superior in tenacity and therefore enables formation of a fuel cell separator which causes no cracking during molding even when made in a small thickness of 0.2 to 0.5 mm (the thickness at the thin portion), which is superior in impact resistance and mechanical strength, and which causes no cracking during cell assembling and cell operation.

Meanwhile, as a curing agent for epoxy resin, an acid anhydride type curing agent and an amine type curing agent are generally known. In the present invention, a phenolic resin and a polycarbodiimide resin are used in combination for increase in glass transition temperature and resultant increase in heat resistance as well as for increase in hot mechanical strength as mentioned above.

As the phenolic resin, there can be mentioned novolac type phenolic resins, cresol type phenolic resins and alkyl-modified phenolic resins. Of these, preferred is a phenolic novolac resin from the standpoints of easy control of the reactivity between the epoxy resin and the polycarbodiimide resin and storage stability of the phenolic resin and the resulting resin composition.

The polycarbodiimide resin has at least one carbodiimide group in the molecule and is represented by the following formula.

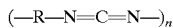

wherein R is a group having at least one carbon atom and n is a polymerization degree falling in an integer range shown below.

The polycarbodiimide resin is synthesized by decarboxylation of an organic diisocyanate. As the organic diisocyanate which gives the group R in above formula, there can be used an aromatic diisocyanate, an aliphatic diisocyanate or an alicyclic diisocyanate. An aromatic diisocyanate such as MDI, TDI or the like is preferably used from the standpoints of heat resistance and moldability.

The polymerization degree n of the polycarbodiimide resin used in the present invention is in a range of preferably 5 to 20, particularly preferably 8 to 12. When the polycarbodiimide resin has a low molecular weight of n=less than 5, the resulting resin composition may have insufficient heat resistance. When the polycarbodiimide resin has a high molecular weight of n=more than 20, the resulting resin composition has low fluidity and may not become uniform.

In the present invention, as mentioned above, the polycarboduimide resin and the phenolic novolac resin are used in combination as a curing agent for the bisphenol A type epoxy resin. Therefore, the fuel cell separator of the present invention, as compared with ordinary separators using a bisphenol A type epoxy resin, shows low moisture absorption, shows stable properties even under a humid condition, has good heat resistance, and shows stable properties even during operation of fuel cell.

With respect to the proportions of the above-mentioned components used in the present fuel cell separator, the bisphenol A type epoxy resin is 15 to 30 parts by weight, the phenolic resin is 2 to 4 parts by weight, and the polycarbodiimide resin is 1 to 10 parts by weight, preferably 1 to 5 parts by weight, all relative to 100 parts by weight of the graphite. When the proportions are not in the above ranges, the resulting resin composition may have inferior moldability.

In the present resin composition, it is possible to add other components to the above-mentioned components. For example, there can be used, as a curing accelerator for the epoxy resin, triphenylphosphine, tetraphenylphosphine, diazabicycloundecene, dimethylbenzylamine, imidazole type compounds, singly or in admixture of two or more kinds.

It is also possible to use, as a release agent, carnauba wax, a metal stearate type soap, a metal montanate type soap or the like. Further, an organic or inorganic fiber may be used.

The fuel cell separator of the present invention can be produced by mixing the above-mentioned graphite, bisphenol A type epoxy resin, phenolic resin and polycarbodiimide resin (both as a curing agent for the epoxy resin), and other components added as necessary, by an appropriate means such as Henschel mixer or the like, subjecting the resulting resin composition to melt kneading and pelletization using a kneader, a twin-screw extruder or the like, and subjecting the resulting pellets to injection molding, transfer molding or compression molding to obtain a fuel cell separator.

The present invention is described in detail below by way of Examples. However, the present invention is in no way restricted to these Examples.

EXAMPLE 1

There were compounded, in proportions shown in Table 1, an artificial graphite (a massive graphite), a bisphenol A type epoxy resin, a phenolic resin, a polycarbodiimide resin, a curing accelerator and an internal release agent. The resulting compound was mixed using a Henschel mixer to produce a resin composition. The resin composition was melt-kneaded at 80 to 100° C. using a kneader and then passed through a double-screw extruder to obtain resin composition pellets. The pellets were compression-molded under conditions of 150° C., 150 kg/cm$^2$ and 5 minutes to produce a fuel cell separator having a thickness of 0.3 mm at the thinnest portion. The surface condition, bending strength and bending modulus at 25° C. and 80° C., heat deformation temperature and specific resistance of the separator are shown in Table 1.

EXAMPLE 2

A fuel cell separator was produced in the same manner as in Example 1 except that in the component proportions of the resin composition of Example 1, the proportion of the epoxy resin was increased as shown in Table 1 and the proportion of the polycarbodiimide resin as a curing agent was decreased. The surface condition, bending strength and bending modulus at 25° C. and 80° C., heat deformation temperature and specific resistance of the separator are shown in Table 1.

EXAMPLE 3

A fuel cell separator was produced in the same manner as in Example 1 except that in the component proportions of the resin composition of Example 1, the proportions of the epoxy resin and the phenolic resin were increased as shown in Table 1 and the proportion of the polycarbodiimide resin was decreased. The surface condition, bending strength and bending modulus at 25° C. and 80° C., heat deformation temperature and specific resistance of the separator are shown in Table 1.

EXAMPLE 4

A fuel cell separator was produced in the same manner as in Example 1 except that in the resin composition of Example 1, a glass fiber was added. The surface condition, bending strength and bending modulus at 25° C. and 80° C., heat deformation temperature and specific resistance of the separator are shown in Table 1.

COMPARATIVE EXAMPLE 1

A fuel cell separator was produced in the same manner as in Example 1 except that in the resin composition of Example 1, no polycarbodiimide resin as a curing agent was used. The surface condition, bending strength and bending modulus at 25° C. and 80° C., heat deformation temperature and specific resistance of the separator are shown in Table 1.

COMPARATIVE EXAMPLE 2

A fuel cell separator was produced in the same manner as in Example 4 except that in the resin composition of Example 4, no carbodiimide resin as a curing agent was used. The surface condition, bending strength and bending modulus at 25° C. and 80° C., heat deformation temperature and specific resistance of the separator are shown in Table 1.

COMPARATIVE EXAMPLE 3

A fuel cell separator was produced by compounding an artificial graphite (a massive graphite), a cresol novolac type epoxy resin, a phenolic resin (as an only curing agent), a curing accelerator and an internal release agent, as shown in Table 1. The surface condition, bending strength and bending modulus at 25° C. and 80° C., heat deformation temperature and specific resistance of the separator are shown in Table 1.

COMPARATIVE EXAMPLE 4

A fuel cell separator was produced by compounding a scaly graphite, a bisphenol A type epoxy resin, a phenolic resin (as an only curing agent), a curing accelerator and an internal release agent, as shown in Table 1. The surface condition, bending strength and bending modulus at 25° C. and 80° C., heat deformation temperature and specific resistance of the separator are shown in Table 1.

strength and is superior in actual applications where use conditions vary.

Fuel cells receive a clamping pressure from other elements, and portable or vehicle-mounting type fuel cells receive an acceleration from various directions. When the separators of the above Examples are used in such fuel cells and are put in an operating condition, they show no change in strength; therefore, there is no fear of deformation or breakage of separator. However, in the separators of Comparative Examples, they show a big change in strength by temperature change, thereby the pressure applied to separator during cell assembling loses its balance, and there is a fear of deformation or breakage of separator, or deformation of used stack per se.

TABLE 1

|  | Examples | | | | Comparative Examples | | | |
| --- | --- | --- | --- | --- | --- | --- | --- | --- |
|  | 1 | 2 | 3 | 4 | 1 | 2 | 3 | 4 |
| Graphite 1 (weight part) | 100 | 100 | 100 | 100 | 100 | 100 | 100 | |
| Graphite 2 (weight part) | | | | | | | | 100 |
| Epoxy resin 1 (weight part) | 16 | 18 | 18 | 20 | 20 | 25 | | 20 |
| Epoxy resin 2 (weight part) | | | | | | | 15 | |
| Curing agent 1 (weight part) | 3.1 | 3.1 | 4.1 | 3.8 | 3.1 | 3.8 | 8.8 | 3.1 |
| Curing agent 2 (weight part) | 3.7 | 1.9 | 1.2 | 4.6 | | | | |
| Curing accelerator (weight part) | 0.25 | 0.25 | 0.5 | 0.31 | 0.25 | 0.31 | 0.25 | 0.25 |
| Glass fiber (weight part) | | | | 23 | | 23 | | |
| Internal release agent (weight part) | 1.2 | 1.2 | 1.2 | 1.5 | 1.2 | 1.5 | 1.3 | 1.2 |
| Surface condition after molding | ◉ | ◉ | ◉ | ○ | ◉ | X | ◉ | ◉ |
| Bending strength 25° C. (MPa) | 65 | 63 | 60 | 85 | 52 | 76 | 40 | 52 |
| Bending strength 80° C. (MPa) | 65 | 63 | 61 | 85 | 36 | 45 | 38 | 30 |
| Bending modulus 25° C. (GPa) | 15.0 | 11.0 | 13.0 | 22.0 | 13.0 | 20.0 | 40.0 | 14.0 |
| Bending modulus 80° C. (GPa) | 15.0 | 11.2 | 13.0 | 21.8 | 7.0 | 14.2 | 37.8 | 7.8 |
| Heat deformation temperature (° C.) | 187 | 182 | 183 | 190 | 110 | 116 | 152 | 115 |
| Specific resistance (mΩ · cm) | 13 | 11 | 11 | 25 | 12 | 25 | 13 | 12 |

Graphite 1: An artificial graphite (a massive graphite) having an average particle diameter of 60 μm (a product of SEC Corporation, SGP 60)
Graphite 2: A scaly graphite having an average particle diameter of 50 μm (a product of Chuetsu Graphite Works Co., Ltd., BF 50A)
Epoxy resin 1: A bisphenol A type epoxy resin (a product of Tohto Kasei Co., Ltd., YD-903N, epoxy equivalent: 800)
Epoxy resin 2: A cresol novolac type epoxy resin (a product of Tohto Kasei Co., Ltd., YDCN-703N, epoxy equivalent: 200)
Curing agent 1: A phenolic novolac resin (a product of Gunei Chemical Industry Co., Ltd., PSM 4261)
Curing agent 2: An aromatic polycarbodiimide resin (a product of Nisshinbo Industries, Inc., Carbodilite 10MSP, carbodiimide equivalent: 216)
Curing accelerator: Triphenylphosphine (a product of Wako Pure Chemical Industries, Inc.)
Glass fiber: A fibrillation product of chopped strand having an average fiber diameter of 10 μm and an average fiber length of 3 mm (a product of Central Glass Co., Ltd.)
Internal release agent: Carnauba wax (a product of Dainichi Chemical Industry Co., Ltd.)
◉: Good in mold-release characteristic and filling nature
○: Good in filling nature
X: Bad in filling nature As is clear from the above Examples, in all the fuel cell separators of Examples, there is substantially no difference between the strength at 25° C. (a temperature assuming a non-operating state including fuel cell assembling and disassembling for maintenance) and the strength at 80° C. (a temperature assuming an operating state of fuel cell. Meanwhile, in Comparative Examples 1, 2 and 4, the strength at 80° C. is strikingly lower than the strength at 25° C.; in Comparative Example 3 using a cresol novolac type epoxy resin having an epoxy equivalent of about 205, the crosslink density when cured is high and there is little adverse effect at high temperatures, but the bending modulus is high and the impact resistance is low. It is clear from the above Examples and Comparative Examples that the fuel cell separator of the present invention is stable in mechanical

What is claimed is:
1. A separator for fuel cell, obtained by molding a resin composition comprising 100 parts by weight of a graphite, 15 to 30 parts by weight of a bisphenol A type epoxy resin, 2 to 4 parts by weight of a phenolic resin, and 1 to 10 parts by weight of a polycarbodiimide resin.
2. A separator for fuel cell according to claim 1, wherein the graphite is an artificial graphite (a massive graphite) having an average particle diameter of 10 to 200 μm.
3. A separator for fuel cell according to claim 1, wherein the epoxy resin has an epoxy equivalent of 500 to 4,000.
4. A separator for fuel cell according to claim 1, wherein the phenolic resin and the polycarbodiimide resin function as a curing agent for the epoxy resin.

* * * * *